United States Patent Office 3,346,616
Patented Oct. 10, 1967

3,346,616
5β-CYANO-A-NORANDROSTANE COMPOUNDS
Seymour D. Levine, North Brunswick, and Pacifico A. Principe, South River, N.J., assignors to E. R. Squibb & Sons, Inc., New York, N.Y., a corporation of Delaware
No Drawing. Filed Aug. 29, 1966, Ser. No. 575,515
9 Claims. (Cl. 260—464)

This invention relates to new steroidal compounds and, more particularly, to new hydroxylated and acylated steroids of the A-norandrostane series, new intermediates useful in the preparation of the same, and processes for preparing the same.

The new final products of this invention are of the Formula I:

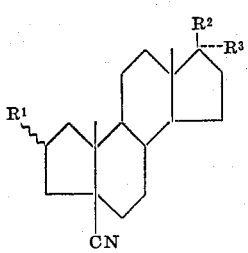

wherein $R^1$ and $R^2$ are hydroxy or acyloxy and $R^3$ is selected from the group hydrogen, vinyl, ethynyl, halo substituted ethynyl and trifluoromethyl substituted ethynyl, and $R^2$ and $R^3$ together are oxo (O=).

Among the suitable acyloxys may be mentioned the acyloxy radical of a hydrocarbon carboxylic acid of less than twelve carbon atoms, as exemplified by the lower alkanoic acids (e.g., acetic, propionic, butyric, hexanoic and enanthic acid), the lower alkenoic acids, the cycloalkane carboxylic acids, the cycloalkene carboxylic acids, the monocyclic aromatic carboxylic acids (e.g., benzoic acid) and the monocyclic aryl-(lower alkanoic) acids (e.g., phenacetic and β-phenylpropionic acid). Among the suitable halogen substituted vinyls may be mentioned perhalovinyls, such as trifluorovinyl, trichlorovinyl, 1,2-difluoro-2-chlorovinyl and 1,2-difluoro - 2 - bromovinyl; the dihalovinyls, such as 1,2-difluorovinyl, 2,2-difluorovinyl, 1-chloro-2-fluorovinyl, 1-bromo-2-fluorovinyl, and 1,2-dichlorovinyl; and the monohalovinyls, such as 1-fluorovinyl, 2-fluorovinyl, 1-chlorovinyl, 2-chlorovinyl, and 1-bromovinyl. Among the suitable halogen substituted ethynyls may be mentioned fluoroethynyl, chloroethynyl and bromoethynyl.

The final products of this invention are physiologically active compounds that possess anti-androgenic activity (i.e., they can be utilized in the treatment of such conditions as hyperandrogenic acne, the dose being adjusted for the activity of the particular compound.

The compounds of this invention are prepared by reducing a compound having the Formula II:

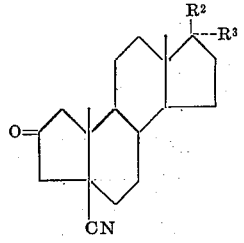

where $R^2$ and $R^3$ are as hereinbefore defined. The 2-hydroxy-17-acyloxy and 2,17-diol compounds of this invention are prepared by treating the corresponding 2-oxo starting material with a reducing agent such as an alkali metal borohydride, e.g., sodium borohydride, potassium borohydride or lithium borohydride to form a mixture of the 2α-hydroxy and 2β-hydroxy derivatives which are then separated by chromatography. The 17-oxo compounds of this invention may be prepared by subjecting 5β-cyano-A-norandrostane - 2 - one-17β-ol to the action of the microorganism *Fusarium javanicum*. This treatment surprisingly yields the 17-oxo - 2α - hydroxy compounds of the invention. The conditions for such microbial reaction are well known in the art and are similar to those specified in U.S. Patent No. 3,179,698.

Starting materials of this invention are prepared by interacting a compound of the Formula III:

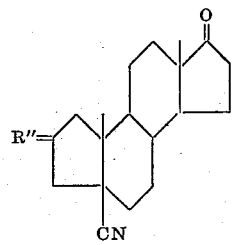

wherein $R''$ is ketal, with a compound of the formula: $R^3X$, wherein $R^3$ is as hereinbefore defined, and X is an activating group such as magnesium bromide, lithium or a complex thereof (e.g., a lithium ethylenediamine complex). Although any ketal may be used, the preferred ketals are those with alkanediols, such as ethylene glycol and propylene glycol. To complete the reaction, water is then added, thereby yielding products of the Formula IV:

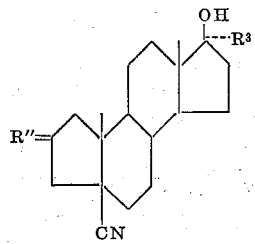

wherein $R''$ and $R^3$ are as hereinbefore defined.

The compound of Formula IV formed contains a 2-ketal group. It may then be hydrolyzed, by treatment with p-toluenesulfonic acid, in acetone-water to yield the corresponding 2-keto derivative starting material of the instant invention.

Preparation of the starting materials of the instant invention wherein $R^2$ is hydroxy and $R^3$ is hydrogen may be prepared in copending application, Ser. No. 355,913, filed Mar. 30, 1964, now U.S. Patent No. 3,271,437. If a 17-ester is desired as the final product, the compound of Formula IV, in its free 2-keto form, is reacted with the acyl chloride or acid anhydride of the desired acid, preferably one of the acids mentioned hereinbefore, to yield the 17-ester.

The following examples illustrate the invention (all temperatures being in centigrade):

EXAMPLE 1

2α-hydroxy-5β-cyano-A-norandrostane-17-one (A) *Fermentation.*—Surface growth from each of 2 two week old agar slants of *Fusarium javanicum* var. *ensiforme* (QM–524) (Army Quartermaster, Natick, Mass.), the slants containing as a nutrient medium (A):

|  | Grams |
|---|---|
| Glucose | 10 |
| Yeast extract | 2.5 |

| | Grams |
|---|---|
| K₂HPO₄ | 1 |
| Agar | 20 |

Distilled water to 1 liter.

is suspended in 5 ml. of 0.01% aqueous sodium lauryl sulfate solution. One ml. portions of this suspension are used to inoculate eight 250 ml. Erlenmeyer flasks each containing 50 ml. of the following sterilized medium (B):

| | Grams |
|---|---|
| Dextrose | 10 |
| Cornsteep liquor | 6 |
| NH₄H₂PO₄ | 3 |
| Yeast extract | 2.5 |
| CaCO₃ | 2.5 |

Distilled water to 1 liter.

After seventy-two hours incubation at 25° C. with continuous rotary agitation (280 cycles/minute; two-inch stroke), 10% (vol./vol.) transfers are made to thirty-four 250 ml. Erlenmeyer flasks each containing 50 ml. of freshly sterilized medium B. After twenty-four hours of further incubation, using the same conditions as described above the steroid (300 micrograms/ml.) is added by supplementing each flask with 0.25 ml. of a sterile solution (60 mg./ml.) of 5β-cyano-A-norandrostane-2-one-17β-ol in N,N-dimethylformamide. A total of 510 mg. is fermented.

After seventy-two hours of further incubation, using identical conditions as described above, the contents of the flasks are pooled and the broth is then filtered through a Seitz clarifying pad. The flasks, mycelium and pad are washed with successive 50 ml. portions of warm water. The combined filtrate and washings have a volume of 2000 ml.

(B) *Isolation.*—The thus obtained filtrate is extracted three times with chloroform. The chloroform extracts are washed three times with water, dried over sodium sulfate and evaporated to dryness. The residue is crystallized from methanol-isopropyl ether to give 242 mg. of 2α-hydroxy-5β-cyano-A-norandrostane-17-one having a melting point of 260–261°. The analytical sample is recrystallized from chloroform-isopropyl ether, M.P. 264–265°; $[\alpha]_D^{24}+93°$ (EtOH); $\lambda^{KBr}$ 2.92, 4.51 and 5.78μ;

$$\tau_{CDCl_3}^{TMS}\ 9.13\ (s.,\ 18\text{-Me})$$

8.74 (s., 19-Me) and 5.65 (m., 2β-H).

*Analysis.*—Calc'd for $C_{19}H_{27}O_2N$ (301.41): C, 75.71; H, 9.03; N, 4.65. Found: C, 75.70; H, 9.16; N, 4.42.

EXAMPLE 2

*2α-acetoxy-5β-cyano-A-norandrostane-17-one*

A solution of 50 mg. of 2α-hydroxy-5β-cyano-A-norandrostane-17-one in 0.4 ml. of acetic anhydride and 0.8 ml. of pyridine is warmed on a steam bath for 1.25 hours, diluted with water and extracted with chloroform. The chloroform extracts are washed with 8% salt solution, dried over sodium sulfate, and evaporated. The residue is crystallized from ether-isopropyl ether to give 30 mg. of 2α-acetoxy-5β-cyano-A-norandrostane-17-one, M.P. 159–160°. The analytical sample is prepared by recrystallization from chloroform-isopropyl ether, M.P. 159–160°; $\lambda^{KBr}$ 4.48 and 5.77μ;

$$\tau_{CDCl_3}^{TMS}\ 9.13\ (s.,\ 18\text{-Me})$$

8.73 (s., 19-Me), 7.95 (s., 2α-acetate) and 4.87 (m., $J_t=24$ cps., 2β-H).

*Analysis.*—Calc'd for $C_{21}H_{29}O_3N$ (343.45): C, 73.43; H, 8.51; N, 4.08. Found: C, 72.62; H, 8.49; N, 4.20.

EXAMPLE 3

*2α-hydroxy-5β-cyano-17β-acetoxy-A-norandrostane and 2β-hydroxy-5β-cyano-17β-acetoxy-A-norandrostane*

A solution of 444 mg. of 5β-cyano-17β-acetoxy-A-norandrostane-2-one in 20 ml. of methanol is treated with 200 mg. of sodium borohydride and left at room temperature for two hours. The reaction mixture is treated with 2 N HCl and water and the methanol removed in vacuo. The aqueous phase is extracted with chloroform and the chloroform extracts washed with 8% salt solution, dried over sodium sulfate and evaporated to dryness. Plate chromatography of the residue using neutral alumina (Activity V) as the adsorbent and chloroform—2% methanol as the developing solvent gives a diffuse band which is detectable by iodine. The band is arbitrarily divided in two portions. Elution of the more polar portion with ethyl acetate and crystallization of the residue from chloroform-ether gives 136 mg. of 2α-hydroxy-5β-cyano-17β-acetoxy-A-norandrostane having a melting point of 246–248°. The analytical sample is prepared by recrystallization from chloroform-isopropyl ether, 246.5–247.5°; $\lambda^{KBr}$ 2.87, 4.48 and 5.78μ;

$$\tau_{CDCl_3}^{TMS}\ 9.20\ (s.,\ 18\text{-Me})$$

8.75 (s., 19-Me), 7.97 (s., 17β-acetate), 5.55 (m., 2β-H) and 5.42 (m., 17α-H).

*Analysis.*—Calc'd for $C_{21}H_{31}O_3N$ (345.47): C, 73.00; H, 9.05; N, 4.05. Found: C, 73.70; H, 8.98; N, 3.89.

The more polar portion is eluted with ethyl acetate and the residue rechromatographed on neutral alumina (Activity V) using chloroform as the developing solvent to give 2 major bands. The less polar band is eluted with ethyl acetate to give after evaporation and crystallization from chloroform-isopropyl ether 2β-hydroxy-5β-cyano-17β-acetoxy-A-norandrostane, M.P. 174–175°. The analytical sample is prepared by recrystallization from chloroform-isopropyl ether, M.P. 175–176°; $\lambda^{KBr}$ 2.87, 4.50 and 5.78μ;

$$\tau_{CDCl_3}^{TMS}\ 9.20\ (s.,\ 18\text{-Me})$$

8.83 (s., 19-Me); 7.96 (s., 17β-acetate), 5.42 (m., 17α-H and 2α-H).

*Analysis.*—Calc'd for $C_{21}H_{31}O_3N$ (345.47): C, 73.00; H, 9.05; N, 4.05. Found: C, 73.01; H, 9.06; N, 4.25.

EXAMPLE 4

*2α,17β-diacetoxy-5β-cyano-A-norandrostane*

A solution of 90 mg. of 2α-hydroxy-5β-cyano-17β-acetoxy-A-norandrostane in 1 ml. of acetic anhydride and 2 ml. of pyridine is left overnight at room temperature. The reaction mixture is diluted with water and the precipitate collected by filtration to give 103 mg. of 2α,17β-diacetoxy-5β-cyano-A-norandrostane having a melting point of 146–147.5°. The analytical sample is prepared by recrystallization from isopropyl ether, M.P. 149.5–150°; $\lambda^{KBr}$ 4.49, 5.80μ;

$$\tau_{CDCl_3}^{TMS}\ 9.22\ (s.,\ 18\text{-Me})$$

8.75 (s., 19-Me), 7.98 (s., 2α-acetate), 7.95 (s., 17β-acetate), 5.46 (t., 17α-H) and 4.86 ($J_t=26$ cps., 2β-H).

*Analysis.*—Calc'd for $C_{23}H_{33}O_4N$ (387.50): C, 71.29; H, 8.58; N, 3.61. Found: C, 71.03; H, 8.65; N, 3.68.

EXAMPLE 5

*2β,17β-diacetoxy-5β-cyano-A-norandrostane*

Following the procedure in Example 4 but substituting 2β-hydroxy-5β-cyano-17β-acetoxy-A-norandrostane for the 2α-isomer there is obtained 2β,17β-diacetoxy-5β-cyano-A-norandrostane.

EXAMPLE 6

*2α,17β-dihydroxy-5β-cyano-A-norandrostane*

A solution of 170 mg. of 2α-hydroxy-17β-acetoxy-5β-cyano-A-norandrostane in 10 ml. of methanol and 1.0 ml. of 10% potassium carbonate solution is stirred at room temperature overnight. The reaction mixture is concentrated, diluted with water, and the precipitate collected by filtration to give 111 mg. of 2α,17β-dihydroxy-5β- cyano-A-norandrostane, M.P. 215–217°. The analytical sample is prepared by recrystallization from methanol-isopropyl ether, M.P. 221–222°; λ$^{KBr}$ 2.93 and 4.50μ.

Analysis.—Calc'd for $C_{19}H_{29}O_2N$ (303.43): C, 75.20; H, 9.63; N, 4.62. Found: C, 75.17; H, 9.37; N, 4.80.

EXAMPLE 7

*17α-ethynyl-5β-cyano-A-norandrostane-2α,17β-diol and 17α-ethynyl-5β-cyano-A-norandrostane-2β,17β-diol*

Following the procedure of Example 3 but substituting 17α-ethynyl-5β-cyano-A-norandrostane-2-one-17β-ol in lieu of 5β-cyano-17β-acetoxy-A-norandrostane-2-one the desired products are obtained.

EXAMPLE 8

*17α-ethynyl-5β-cyano-A-norandrostane-2α-hydroxy-17β-ol 17-acetate*

Substituting 17α-ethynyl-5β-cyano-A-norandrostane-2-one-17β-ol acetate in lieu of 5β-cyano-17β-acetoxy-A-norandrostane-2-one in Example 3 the desired product is obtained.

EXAMPLE 9

*17α-trifluoropropynyl-5β-cyano-A-norandrostane-2α,17β-diol and 17α-trifluoropropynyl-5β-cyano-A-norandrostane-2β,17β-diol*

Following the procedure of Example 3 but utilizing 17α-trifluoropropynyl-5β-cyano-A-norandrostane-2-one-17β-ol in lieu of 5β-cyano-17β-acetoxy-A-norandrostane-2-one the desired products are obtained.

In a similar manner following the procedure of Example 3 but utilizing

17α-chloroethynyl-5β-cyano-A-norandrostane-2-one-17β-ol;
17β-chloroethynyl-5β-cyano-A-norandrostane-2-one-17β-ol;
17α-trifluorovinyl-5β-cyano-A-norandrostane-2-one-17β-ol;
17α-β-chlorovinyl-5β-cyano-A-norandrostane-2-one-17β-ol;
17α-α,β-dichlorovinyl-5β-cyano-A-norandrostane-2-one-17β-ol;
17α-α,β-difluorovinyl-5β-cyano-A-norandrostane-2-one-17β-ol;
17α-trifluoropropynyl-5β-cyano-A-norandrostane-2-one-17β-ol acetate;
17α-ethynyl-5β-A-norandrostane-2-one-17β-ol the products formed are:

17α-chloroethynyl-5β-cyano-A-norandrostane-2β,17β-diol and
17α-chloroethynyl-5β-cyano-A-norandrostane-2α,17β-diol;
17β-chloroethynyl-5β-cyano-A-norandrostane-2β,17β-diol and
17β-chloroethynyl-5β-cyano-A-norandrostane-2α,17β-diol;
17α-trifluorovinyl-5β-cyano-A-norandrostane-2β,17β-diol and
17α-trifluorovinyl-5β-cyano-A-norandrostane-2α,17β-diol;
17α-β-chlorovinyl-5β-cyano-A-norandrostane-2β,17β-diol and
17α-β-chlorovinyl-5β-cyano-A-norandrostane-2α,17β-diol;
17α-α,β-dichlorovinyl-5β-cyano-A-norandrostane-2β,17β-diol and
17α-α,β-dichlorovinyl-5β-cyano-A-norandrostane-2α,17β-diol;
17α-α,β-difluorovinyl-5β-cyano-A-norandrostane-2β,17β-diol and
17α-α,β-difluorovinyl-5β-cyano-A-norandrostane-2α,17β-diol;
17α-trifluoropropynyl-5β-cyano-A-norandrostane-2β,17β-diol and
17α-trifluoropropynyl-5β-cyano-A-norandrostane-2α,17β-diol; respectively.

The invention may be otherwise embodied within the scope of the appended claims.

We claim:

1. A compound having the formula

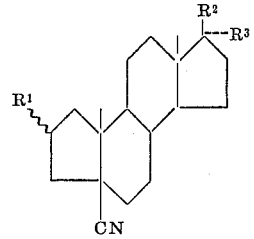

wherein $R^1$ and $R^2$ are hydroxy or an acyloxy group of a hydrocarbon carboxylic acid of less than twelve carbon atoms and $R^3$ is selected from the group hydrogen, vinyl, ethynyl, halo substituted vinyl, trifluoromethyl substituted vinyl, halo substituted ethynyl and trifluoromethyl substituted ethynyl and $R^2$ and $R^3$ together are oxo (O=).

2. The compound 2α-hydroxy-5β-cyano-A-norandrostane-17-one.

3. The compound 2α-acetoxy-5β-cyano-A-androstane-17-one.

4. The compound 2α-hydroxy-5β-cyano-17β-acetoxy-A-norandrostane.

5. The compound 2β-hydroxy-5β-cyano-17β-acetoxy-A-norandrostane.

6. The compound 2α,17β-diacetoxy-5β-cyano-A-norandrostane.

7. The compound 2β,17β-diacetoxy-5β-cyano-A-norandrostane.

8. The compound 2α,17β-dihydroxy-5β-cyano-A-norandrostane.

9. The compound 2β,17β-dihydroxy-5β-cyano-A-norandrostane.

References Cited

UNITED STATES PATENTS 3,271,437   9/1966   Levine _____ 260—464

CHARLES B. PARKER, *Primary Examiner.*

JOSEPH P. BRUST, *Examiner.*